United States Patent
Keiser et al.

(10) Patent No.: US 9,787,656 B1
(45) Date of Patent: Oct. 10, 2017

(54) INTELLIGENT FACILITY DEVICE

(71) Applicant: Securus Technologies, Inc., Dallas, TX (US)

(72) Inventors: Luke Keiser, Frisco, TX (US); Scott Passe, Forney, TX (US)

(73) Assignee: Securus Technologies, Inc., Carrollton, TX (US)

(*) Notice: Subject to any disclaimer, the term of this patent is extended or adjusted under 35 U.S.C. 154(b) by 102 days.

(21) Appl. No.: 13/931,855

(22) Filed: Jun. 29, 2013

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC ............. *H04L 63/08* (2013.01); *H04L 63/10* (2013.01); *H04L 63/30* (2013.01); *H04L 63/108* (2013.01)

(58) Field of Classification Search
CPC ........ H04L 63/10–63/108; H04L 63/20; H04L 63/30–63/308; H04L 41/08–41/0806; H04L 41/20; H04L 41/28; H04L 41/50–41/5012; H04L 41/5041; H04L 41/505
USPC .................................................. 726/2, 3, 7
See application file for complete search history.

(56) References Cited

U.S. PATENT DOCUMENTS

| | | | |
|---|---|---|---|
| 7,444,669 B1* | 10/2008 | Bahl et al. ........................ 726/3 |
| 7,734,306 B2 | 6/2010 | Olson | |
| 8,644,875 B2 | 2/2014 | Kiukkonen et al. | |
| 8,793,774 B1* | 7/2014 | Kumar et al. ..................... 726/6 |
| 8,832,374 B1* | 9/2014 | Schaefers ........... H04L 67/1097 711/115 |
| 8,869,253 B2* | 10/2014 | Atkinson ........................... 726/7 |
| 9,094,569 B1* | 7/2015 | Humphries .............. H04N 7/14 |
| 9,117,216 B1* | 8/2015 | Nguyen ................. G06Q 30/02 |
| 2006/0023651 A1* | 2/2006 | Tsuchiuchi ............ H04W 12/06 370/310 |
| 2009/0222659 A1* | 9/2009 | Miyabayashi et al. ........ 713/156 |
| 2010/0087145 A1 | 4/2010 | Ikeda | |
| 2011/0086614 A1* | 4/2011 | Brisebois ................. H04K 3/42 455/411 |
| 2013/0176956 A1* | 7/2013 | Yamamoto ..................... 370/329 |
| 2013/0194377 A1* | 8/2013 | Humphries .............. H04N 7/15 348/14.08 |
| 2013/0263227 A1* | 10/2013 | Gongaware ............ H04L 63/08 726/4 |
| 2013/0347073 A1* | 12/2013 | Bryksa .................. H04L 63/105 726/4 |
| 2014/0280758 A1* | 9/2014 | Sharma ................. H04W 4/021 709/219 |

* cited by examiner

Primary Examiner — Daniel Potratz
(74) Attorney, Agent, or Firm — Fogarty LLP

(57) ABSTRACT

Embodiments of intelligent facility devices for use in controlled facility environments are described. In various embodiments, the intelligent facility devices provide limited or controlled access to data networks for inmates of a controlled facility. An embodiment of a method may include receiving a request for access to a network from a user interface device. The method may also include determining an authorized duration of network access for the user interface device. Additionally, the method may include establishing a temporary network access session between the user interface device and the network for the authorized duration of network access.

20 Claims, 4 Drawing Sheets

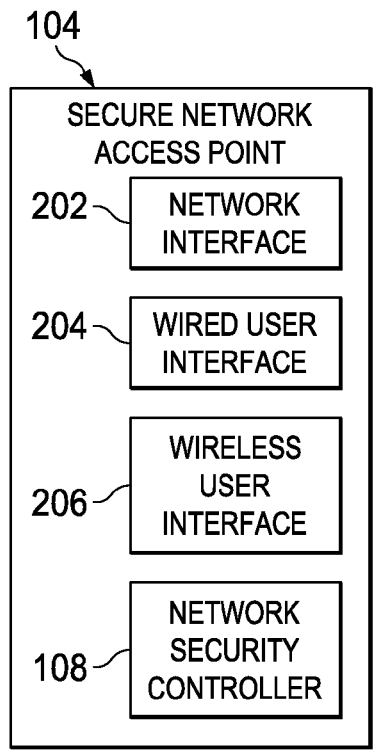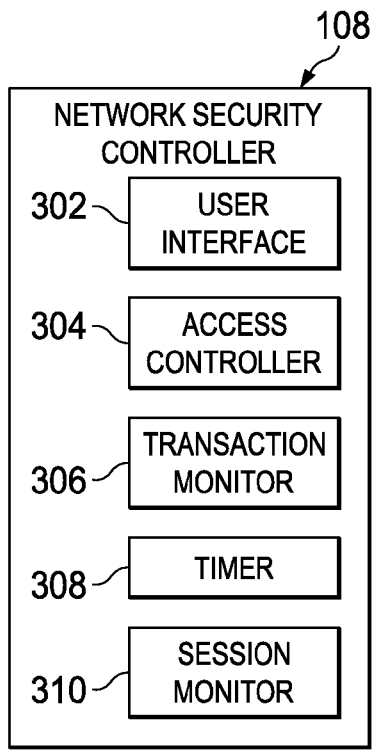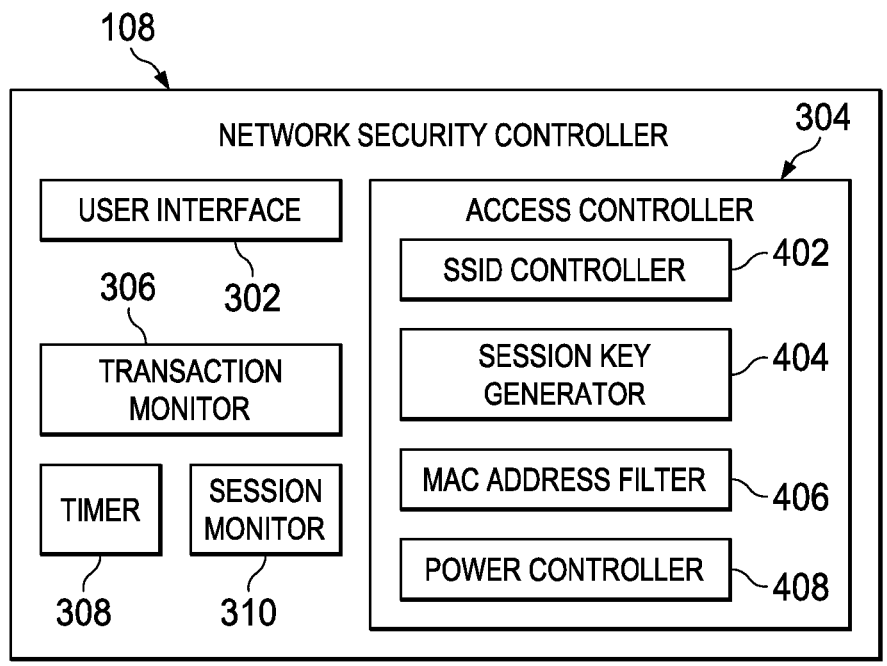

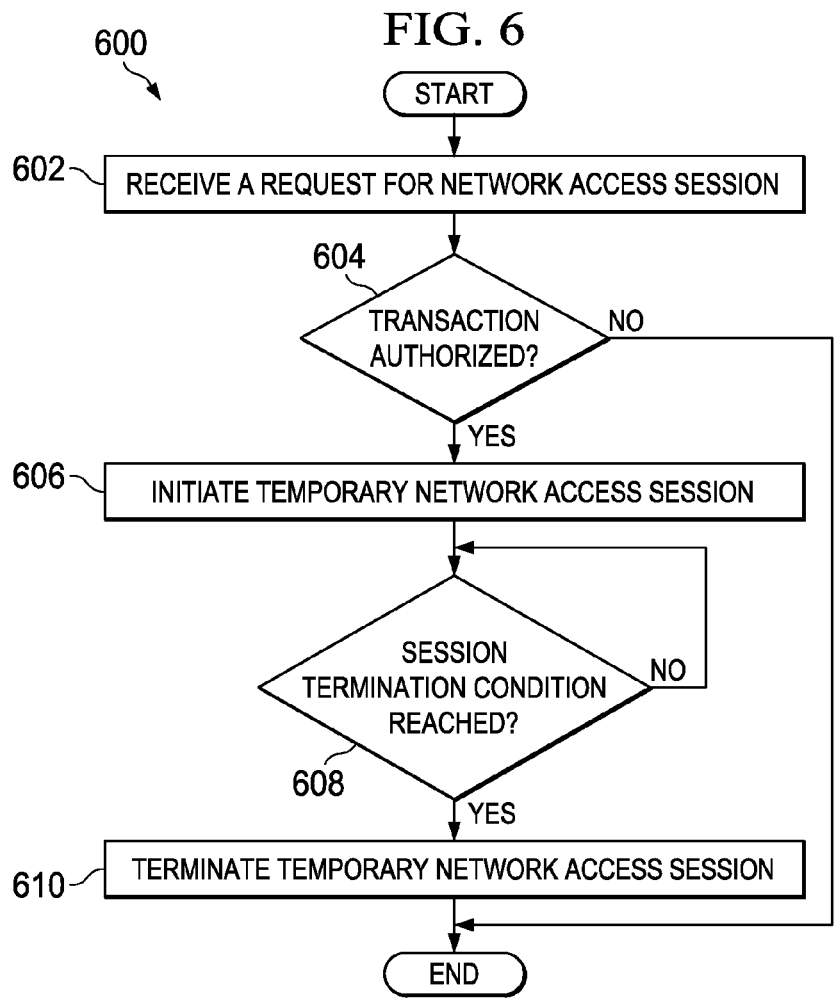
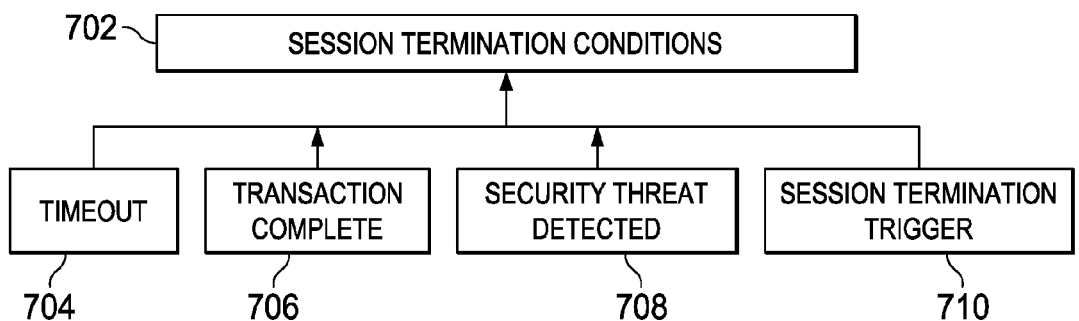

INTELLIGENT FACILITY DEVICE

BACKGROUND

This application is related by subject matter to non-provisional U.S. patent application Ser. No. 13/931,858, also entitled "Intelligent Facility Device," filed contemporaneously herewith, which is incorporated, in its entirety, herein by reference.

Secure facilities often face security risks and challenges that go beyond those faced in conventional environments. Security threats can come from both external and internal sources. Often the internal threats are more concerning than external threats. This is particularly the case in correctional facility environments, where inmates may attempt to harm other people or property.

In certain situations, residents of secure facilities may be given access to computing devices, such as personal tablet devices. The residents may use the tablet devices to access media, documents, books, account information, and other types of information. Conventional tablet devices may include wireless communication capabilities for allowing the resident to access facility information systems.

The resident's access to the facility information systems may be restricted or limited. For example, residents of secure facilities are often restricted to access of internal networks. Also, other content restrictions may be placed on the resident. Usage timing or duration limits may also be placed on the resident.

One particular security risk may include a resident attempting to circumvent or otherwise attack or hack usage limitations or restrictions. Additional risks include residents attempting to conduct unauthorized communications, either with other residents of the facility or with external contacts. Residents may also attempt to gain access to facility account information, or other sensitive information, without authorization. Many such risks exist, and indeed, many such risks may be unknown to system administrators at the time that security policies are implemented. For example if rouge wireless networks or other network hotspots are accessed by unauthorized residents of a controlled environment covertly then unauthorized pictures or videos could be distributed by unauthorized residents of the controlled environment facility to other inmates or the public. Additionally, criminals may be able to continue directing or carrying on criminal acts while in prison if they gain unauthorized network access.

In many environments, residents may be granted limited access to the facility information systems through wireless access points. Conventional wireless access points may not have sufficient security features for implementation in a secure facility environment because of the risks described above, and because of many other risks.

SUMMARY

Embodiments of intelligent facility devices for use in controlled facility environments are described. In various embodiments, the intelligent facility devices provide limited or controlled access to data networks for inmates of a controlled facility. An embodiment of a method may include receiving a request for access to a network from a user interface device. The method may also include determining an authorized duration of network access for the user interface device. Additionally, the method may include establishing a temporary network access session between the user interface device and the network for the authorized duration of network access.

In one embodiment, determining the authorized duration includes determining a duration of a transaction to be conducted between the user interface device and the network. The duration of the transaction may be determined dynamically during the network access session. Alternatively, the duration is statically determined prior to initiation of the network access session.

In an embodiment, the method also includes generating a temporary network access key for initiating the temporary network access session. The temporary network access key may be valid for a limited duration of time. In such an embodiment, the method may include terminating the temporary network access session in response to a determination that the temporary network access key has expired.

A tangible computer program product comprising computer executable code that, when executed by a data processing device, causes the computer to perform operations corresponding to the steps of the method described above is also presented.

Embodiments of systems for providing limited network access are also presented. In one embodiment a system includes a user interface, a network security controller coupled to the user interface, and a network interface coupled to the user interface. In an embodiment, the user interface may be configured to receive a request for access to a network from a user interface device. The network security controller may determine an authorized duration of network access for the user interface device. Additionally, the network interface may establish a temporary network access session between the user interface device and the network for the authorized duration of network access.

In an embodiment, the network security controller is further configured to determine a duration of a transaction to be conducted between the user interface device and the network. In one embodiment, the duration of the transaction is determined dynamically during the network access session. Alternatively, the duration is statically determined prior to initiation of the network access session.

In an embodiment, the network security controller also includes an access controller configured to generate a temporary network access key for initiating the temporary network access session. The temporary network access key may be valid for a limited duration of time. In an embodiment, the network security controller is further configured to terminate the temporary network access session in response to a determination that the temporary network access key has expired.

BRIEF DESCRIPTION OF THE DRAWINGS

Figure 1A:
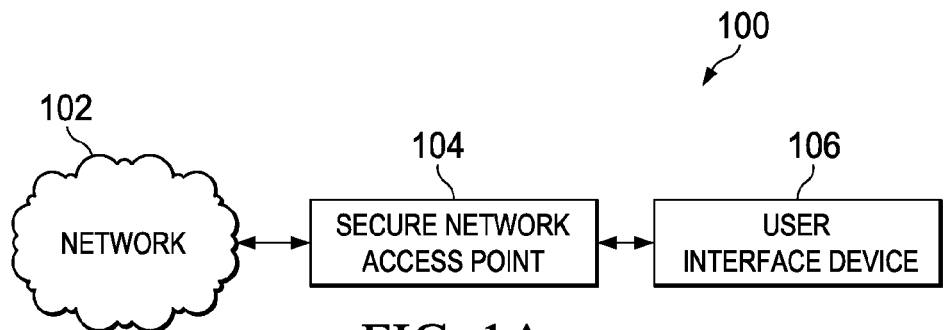

Having thus described the invention in general terms, reference will now be made to the accompanying drawings, which are not necessarily drawn to scale, and wherein:

FIG. 1A is a schematic block diagram illustrating one embodiment of a computing system having improved network security.

Figure 1B:
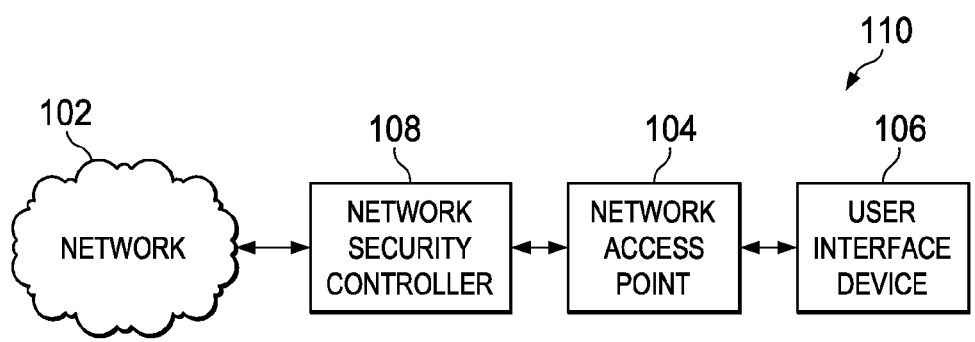

FIG. 1B is a schematic block diagram illustrating one embodiment of a computing system having improved network security.

Figure 1C:
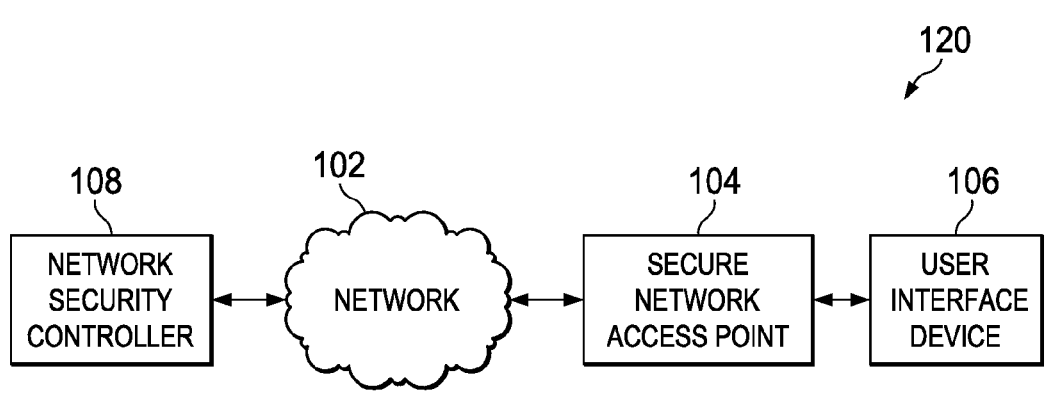

FIG. 1C is a schematic block diagram illustrating one embodiment of a computing system having improved network security.

FIG. 2 is a schematic block diagram illustrating one embodiment of a secure network access point.

FIG. 3 is a schematic block diagram illustrating one embodiment of a network security controller.

FIG. 4 is a schematic block diagram illustrating one embodiment of a network security controller.

Figure 5:
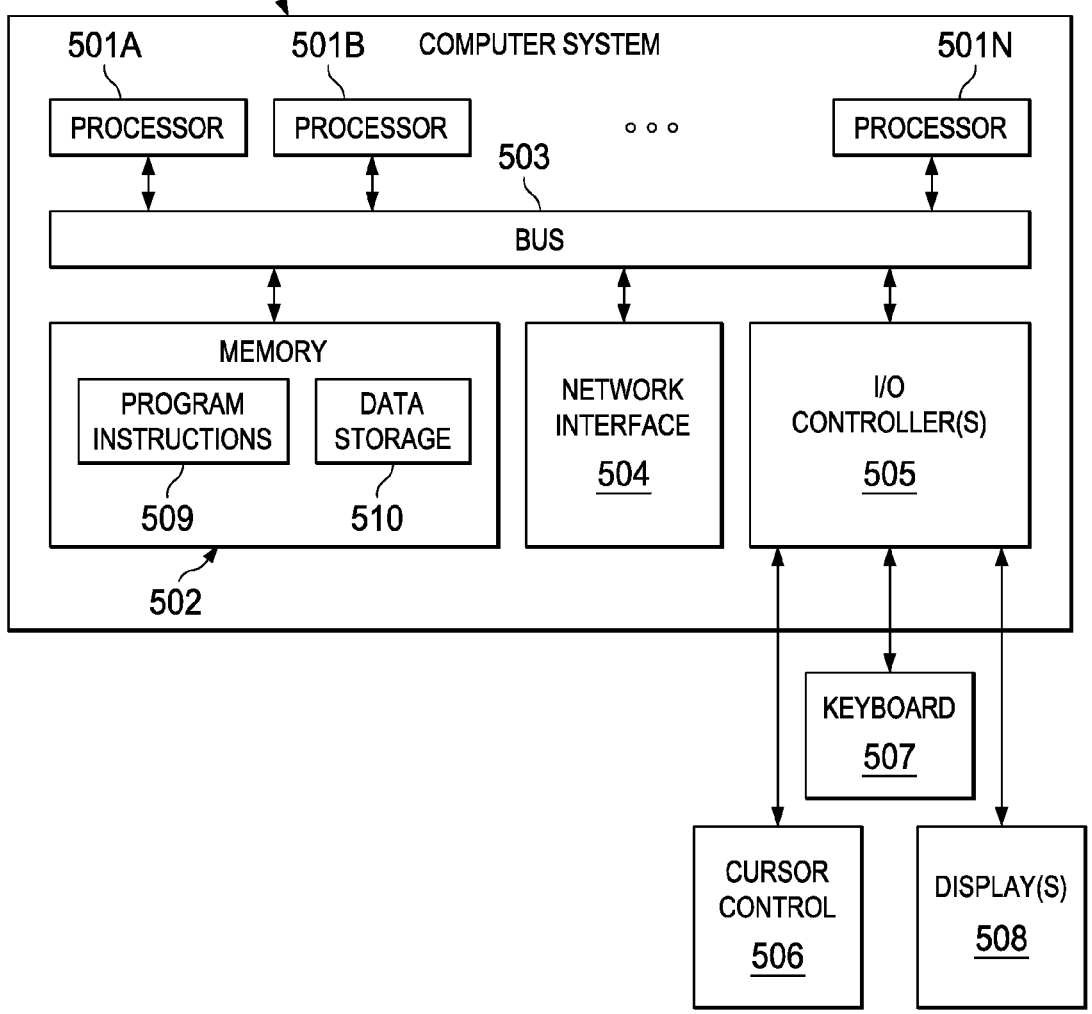

FIG. 5 is a schematic block diagram illustrating one embodiment of computer system according to the present embodiments.

FIG. 6 is a schematic flowchart diagram illustrating one embodiment of a method for improved network security.

FIG. 7 is a diagram illustrating embodiments of session termination conditions.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1A illustrates one embodiment of a system 100 having improved network security. The system 100 may include a network 102 and one or more user interface devices 106 configured to access the network 102 via secure network access point 104. In one embodiment, the network access point 104 may provide access between the network 102 and the user interface device 106 on a session basis. The access may be restricted based upon one or more pre-set restriction criteria.

In one embodiment the network 102 is internal to the secure facility, such as an intranet system. The intranet system may include a Local Area Network (LAN), or a Wide Area Network (WAN) between a plurality of secure facility locations. In another embodiment the network 102 may be a WAN that includes a network management facility. The network management facility may be operated by the secure facility administrators or by a third-party vendor. In a further embodiment, the network 102 may include access to the Internet. Components of the network 102 may include network routers, switches, hubs, firewalls and other security devices, servers, storage devices, quality of service devices, network access/routing backbone devices, transmission lines and transmission switches, repeaters, and the like. One of ordinary skill in the art will recognize that network 102 may include various scales and configurations of devices for use in internetworking one or more computing devices.

User interface device 106 may include a tablet device, a mobile data device, such as a smartphone or web-enabled personal data assistant. In other embodiments, user interface device 106 may include a personal computer, a laptop computer, a kiosk, and other types of computing devices configured to interface with network 102 via secure network access point 104.

Secure network access point 104 may provide the user interface device 106 with data communication access to the network 102. For example, secure network access point 104 may provide a wireless data communication link between the user interface device 106 or and the network 102. Embodiments of wireless communication links include WiFi links, such as IEEE 802.11x protocol links, Bluetooth and other Personal Area Network (PAN) links, WiMAX links, 3G or 4G mobile data access links, Near Field Communication (NFC) links, or the like.

In another embodiment, secure network access point 104 may provide a wired data communication link. In one embodiment a wired data communication link may include an Ethernet data connection for communication over Transmission Control Protocol and Internet Protocol (TCP/IP), User Datagram Protocol (UDP), or the like. Other embodiments include communication links over Universal Serial Bus (USB), Firewire, or other wired data communications protocols.

In one embodiment, secure network access point 104 may provide greater overall security to network 102 from attacks by user interface device 106 than conventional network access points. For example, secure network access point 104 may operate according to one or more security rules or profiles for enhancing security of the network 102. For example, secure network access point 104 may only provide temporary access to user interface device 106 during a user session, but may not provide access to user interface device 106 outside of the user session. Embodiments of methods for providing enhanced security which the secure network access point 104 may be configured to carry out are described herein. For example, various encryption methods and tunneling protocols such as SSH, HTTPS, VPN, GRE and the like may be incorporated. Any encryption keys generated as part of each session may be discarded at the end of the session so that they would be unusable as part of any other transaction.

FIG. 1B is a schematic block diagram illustrating one embodiment of a computing system 110 having improved network security. The system 110 may include network 102 and user interface 106 as described above. Additionally, system 110 may include secure network access point 104 and network security controller 108. Secure network access point 104 may be configured to operate in conjunction with network security controller 108 to provide enhanced network security. In another embodiment, network access point 104 may be a conventional network access point, but network security controller 108 may be configured to control access provided by network access point 104 such that security is enhanced. User interface device 106 may be configured to connect to the network 102 directly through secure network access point 104, which then connects to the network 102 through network security controller 108. In another embodiment, user interface device 106 connects through network security controller 108, which then connects to network 102 through network access point 104. One of ordinary skill in the art may recognize a variety of alternative system configurations which may be suitable for use with the present embodiments.

For example, FIG. 1C is a schematic block diagram illustrating one embodiment of a computing system 120 having improved network security. The embodiment of FIG. 1C includes the network 102, the secure network access point 104, the user interface device 106 as described above. System 120 also includes network security controller 108, which may be coupled to the network 102, but may be located remotely from the secure network access point 104. In one embodiment, the secure network access point 104 may communicate with network security controller 108 over network 102 to obtain security keys, authorization to provide access to user interface device 106, or other configuration information.

FIG. 2 is a schematic block diagram illustrating one embodiment of a secure network access point 104. The secure network access point 104 may include a network interface 202 for connecting to the network 102. Connections to network 102 may include TCP/IP connections to routers, switches, or modems on the network. For example, network interface 202 may connect to a fiber optic modem, a cable modem, a Digital Subscriber Line (DSL) modem, a T-1 line, or the like. In one embodiment, the network interface 202 could include a wireless interface, such as a WiMAX interface, or a cellular data communication interface.

In one embodiment, secure network access point 104 may also include a wired user interface 204. Wired user interface 204 may include ports for connecting to the user interface device 106 via an Ethernet data connection, a USB connection, a Firewire connection, or other wired data communications connections.

In an embodiment, secure network access point 104 may include a wireless user interface 206. The wireless user interface 206 may include components for connecting to the user interface device 106 via a wireless communication link. For example, the wireless user interface 206 may include a WiFi module. Alternative embodiments may include an NFC module, a Bluetooth module, or the like.

In addition, secure network access point 104 may include logic, circuits, and/or modules for linking the network interface 202 and at least one of the wired user interface 204 or the wireless user interface 206. Such functions may be carried out by, for example, a data processor. One of ordinary skill in the art would recognize one or more methods for linking traffic between the interfaces 202, 204, 206; therefore the specific methods are not discussed herein.

In one embodiment, for example the embodiment of FIG. 1A, the network security controller 108 may be integrated with the secure network access point 104. In an alternative embodiment, the network security controller 108 may have functionality and/or components that may be found both internal to the secure network access point 104 and external to the secure network access point 104, as shown, for example, in FIG. 1C. For example, the internal components may be configured to communicate with external components to receive information, such as a temporary security key, for example. Further embodiments of the network security controller 108 are discussed with reference to the following figures.

FIG. 3 is a schematic block diagram illustrating one embodiment of a network security controller 108. In one embodiment the network security controller 108 may include one or more modules including a user interface 302, an access controller 304, a transaction monitor 306, a timer 308 and a session monitor 310. These modules may receive a request for access to a network interface device, determine an authorized duration of network access for the user interface device 106 and to establish a temporary network access session between the user interface device 106 and the network 102.

The user interface 302 may be implemented in one or more of a variety of embodiments. For example, the user interface 302 may be coupled to one of the wired user interface 204 or the wireless user interface 206 for receiving communications from the user interface device 106. In another embodiment, the user interface 302 may be a separate device, such as a separate facility computer, kiosk, telephone system, or the like for accessing the network security controller 108 and collecting information to be used for establishing the temporary network access session.

The access controller 304 may be coupled to the user interface device 302 in one embodiment. The access controller 304 may generate information for establishing a temporary network access session between the user interface device 106 and the network 102. For example, the information may include a temporary network access key for initiating the temporary network access session. In other embodiments, the access controller 304 may enable a link between the network interface 202 and one of the wired user interface 204 or the wireless user interface for a limited duration. In other embodiments, the access controller 304 may provide a Personal Identification Number (PIN), or password for enabling access to the network 102.

In one embodiment, transaction monitor 306 may track the progress of a transaction conducted between the user interface device 106 and the network 102. For example, an inmate in a correctional facility may request a temporary access code from the access controller 304 via the user interface 302. The access controller 304 may generate a temporary access code for establishing the temporary network access session, the duration of which is determined by the length of the transaction, such as the length of time required to download a media file from the network 102. The transaction monitor 306 may track the progress of the transaction and signal the end of the transaction upon completion. In response, the access controller 304 may deactivate the temporary access code. Thus, in one embodiment, the duration of the network access session may be determined dynamically in response to the progress of the transaction. The network security controller 108 may set a time limit for the temporary network access session. The timer 308 may track the time during which the temporary network access session is active. Upon expiration of the time period, the access controller 304 may deactivate the temporary access code. Thus, in one embodiment, the duration of the network access session may be determined statically by the access controller 304. In some embodiments, the timer 308 may be used to determine whether the network access session has reached a predetermined duration threshold. In another embodiment, the timer 308 may be used to determine whether the network access threshold has been inactive for a predetermined threshold of time. The timer 308 may make such determinations directly, or in another embodiment, the access controller 304 may use timing information provided by the timer 308 to make the determinations. Date and time of day access, inmate privilege class, inmate/terminal location, and/or facility segmentations may also be incorporated in the control options. In one embodiment, network security controller 108 may also include a session monitor 310. The session monitor 310 may be configured to track activity during a network access session. For example, session monitor 310 may receive information from transaction monitor 306 to determine whether a session is inactive. Session monitor 310 may also receive information from timer 308 to track the duration of session inactivity. In still other embodiments, session monitor 310 may prompt re-entry of a PIN or other access key in response to session inactivity. The session monitor 310 may also track transactions conducted or attempted by user interface device 106. If an attempt to conduct an unauthorized transaction is made, the session monitor 310 may trigger termination of the network access session. For example, the session monitor 310 may communicate the trigger to the access controller 304, which may terminate the session.

In another embodiment, session monitor 310 may facilitate a system administrator, monitor, or other $3^{rd}$ party to monitor the communication session between the user interface device 106 and the network 102 via the secure network access point 104. In such an embodiment, the session monitor 310 may provide information regarding the transactions being conducted, the time parameters of the session, and other information suitable for monitoring the transactions being conducted in the secure facility network.

FIG. 4 is a schematic block diagram illustrating one embodiment of a network security controller 108. In the depicted embodiment, the network security controller 108 may include the user interface 302, the transaction monitor 306, the timer 308, and/or the session monitor 310 as described in FIG. 3. In an embodiment, the access controller 304 may include one or more additional modules for controlling access to the network 102. For example, the access controller 304 may include an SSID controller 402, a session key generator 404, a Media Access Control (MAC) address filter 406, and a power controller 408. These various modules may perform various functions for limiting access to the network 102.

In one embodiment, the SSID controller 402 may determine whether a Service Set Identifier (SSID) associated with the secure network access point 104 is broadcast. In another embodiment, the SSID controller 402 may broadcast an SSID associated with the secure network access point 104 for a limited period of time. In still a further embodiment, the SSID controller 402 may change the SSID associated with the secure network access point 104 each time the SSID is broadcast to limit the possibility of a user interface device 106 being able to find the SSID of the secure network access point 104 based on a previous connection or previously stored SSID information. In still a further embodiment, the SSID of the secure network access point 104 may be provided to the user interface device 106 or to the user as part of a network access authorization process. In still a further embodiment, the SSID of the secure network access point is not broadcast, but only displayed on the screen of the secure network access point for the purposes of pairing the secure network access point, with portable devices.

For example, the user may interact with the user interface 302 to request access to the network 102. If the user is authorized to access the network, the SSID controller 402 may generate an SSID to be used for accessing the secure network access point 104 and provided to the user via the user interface 302. In another example, the SSID controller 402 may generate a new SSID on a periodic basis, for example on an hourly, daily, weekly, or monthly basis.

In an embodiment, the session key generator 404 may generate a temporary PIN, temporary network access key, temporary session initiation key, a temporary password, or the like. For example, the session key generator 404 may generate a Wired Equivalent Privacy (WEP) key, a Wi-Fi Protected Access (WPA) Preshared Key (PSK), or another key for accessing a private session with the secure network access point 104. In such an embodiment, the secure network access point 104 may be configured to allow the user interface device 106 to access the network 102 via secure network access point 104 for a limited time period by terminating access associated with the key in response to a determination that a key expiration event has occurred. A key expiration event may include a connection time threshold being reached, a transaction count threshold being reached, a session inactivity duration threshold being reached, or the like.

MAC address filter 406 may filter user interface devices 106 that are authorized to access network 102 based on a MAC address assigned to the network interface module of the user interface device 106. For example, MAC address filter 406 may include a list of authorized MAC addresses that may access the secure network access point 104. In another embodiment, the MAC address filter 406 may access a list that is stored on/at a separate data storage device or location. In a further embodiment, an access time limit may be assigned to the MAC address, and once the time limit is expired, the user interface device associated with the MAC address is no longer authorized to access the secure network access point 104. In other embodiments, once a transaction is concluded or a session has timed out, the connection with the device associated with the MAC address may be terminated.

In still other embodiments, a session number limitation may be imposed, to limit the number of concurrent or independent wireless access sessions to a finite number. For example, the inmate may be limited to a single session in some embodiments.

In a further embodiment, the access controller 304 may include a power controller. The power controller may be configured to terminate power to one or more components of the secure network access point 104 used for establishing the communication link with the user interface device 106. For example, once the session has expired, the power controller 408 may reduce Radio Frequency (RF) power on one or more communication channels used for communicating with the user interface device 106. In another embodiment, the power to a wired communication link may be terminated. In still a further embodiment, the power to one or more modules of the secure network access point 104 may be reduced or turned off rendering the secure network access point 104 inaccessible until it is reinitialized by an authorized user interface device 106 or by a system administrator or by another authorized system user. The power controller may also be used to reduce Radio Frequency (RF) power to only the amount necessary to communicate with other devices, within a limited distance proximity, for the purpose of limiting any potential interception by unauthorized devices.

In some embodiments, secure network access point 104, the network security controller, and/or the user interface device 106 may be implemented or executed by one or more computer systems, an example of which is illustrated in FIG. 5. In various embodiments, computer system 500 may be a router, switch, a workstation, a network computer, a desktop computer, a laptop, a tablet device, or the like.

As illustrated, computer system 500 includes one or more processors 501A-N coupled to a system memory 502 via bus 503. Computer system 500 further includes network interface 504 coupled to bus 503, and input/output (I/O) controller(s) 505, coupled to devices such as cursor control device 506, keyboard 507, and display(s) 508. In some embodiments, a given entity (e.g., secure network access point 201) may be implemented using a single instance of computer system 500, while in other embodiments multiple such systems, or multiple nodes making up computer system 500, may be configured to host different portions or instances of embodiments.

In various embodiments, computer system 500 may be a single-processor system including one processor 501A, or a multi-processor system including two or more processors 501A-N (e.g., two, four, eight, or another suitable number). Processor(s) 501A-N may be any processor capable of executing program instructions. For example, in various embodiments, processor(s) 501A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 501A-N may commonly, but not necessarily, implement the same ISA. Also, in some embodiments, at least one processor(s) 501A-N may be a graphics processing unit (GPU) or other dedicated graphics-rendering device.

System memory 502 may be configured to store program instructions and/or data accessible by processor(s) 501A-N. For example, memory 502 may be used to store a software program. In various embodiments, system memory 502 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 502 as program instructions 509 and data storage 510, respectively. In other embodiments, program instructions and/or data may be received, sent or stored upon different types of computer-accessible media or on similar media separate from system memory 502 or computer system 500. Generally speaking, a computer-accessible medium may include any tangible, non-transitory storage media or memory media such as electronic, magnetic, or optical media—e.g., disk or CD/DVD-ROM coupled to computer system 500 via bus 503, or non-volatile memory storage (e.g., "flash" memory)

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 503 may be configured to coordinate I/O traffic between processor 501, system memory 502, and any peripheral devices including network interface 504 or other peripheral interfaces, connected via I/O controller(s) 505. In some embodiments, bus 503 may perform any necessary protocol, timing or other data transformations to convert data signals from one component (e.g., system memory 502) into a format suitable for use by another component (e.g., processor(s) 501A-N). In some embodiments, bus 503 may include support for devices attached through various types of peripheral buses, such as a variant of the Peripheral Component Interconnect (PCI) bus standard or the Universal Serial Bus (USB) standard, for example. In some embodiments, the operations of bus 503 may be split into two or more separate components, such as a north bridge and a south bridge, for example. In addition, in some embodiments some or all of the operations of bus 503, such as an interface to system memory 502, may be incorporated directly into processor(s) 501A-N.

Network interface 504 may be configured to allow data to be exchanged between computer system 500 and other devices, such as other computer systems attached to network 102, or secure network access point 104 or user interface devices as shown in FIGS. 1A-C, for example. In various embodiments, network interface 504 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 505 may, in some embodiments, enable connection to one or more display terminals, keyboards, keypads, touch screens, scanning devices, voice or optical recognition devices, or any other devices suitable for entering or retrieving data by one or more computer system 500. Multiple input/output devices may be present in computer system 500 or may be distributed on various nodes of computer system 500. In some embodiments, similar I/O devices may be separate from computer system 500 and may interact with computer system 500 through a wired or wireless connection, such as over network interface 504.

As shown in FIG. 5, memory 502 may include program instructions 509, configured to implement certain embodiments described herein, and data storage 510, comprising various data accessible by program instructions 509. In an embodiment, program instructions 509 may include software elements of embodiments illustrated in FIG. 6. For example, program instructions 509 may be implemented in various embodiments using any desired programming language, scripting language, or combination of programming languages and/or scripting languages. Data storage 510 may include data that may be used in these embodiments, for example to store lists of authorized user interface devices 106. In other embodiments, other or different software elements and data may be included.

A person of ordinary skill in the art will appreciate that computer system 500 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

FIG. 6 is a schematic flowchart diagram illustrating one embodiment of a method 600 for improved network security. In one embodiment, the method 600 starts with receiving 602 a request for a network access session. The request may be received 602 from a user interface device 106 or via the user interface 302 of the network security controller 108. In further embodiments, the request may be received 602 via a telephone request line or an access request network.

If a transaction is authorized as determined at block 604, then the user interface 106 may initiate 606 a temporary network access session with the secure network access point 104. If a session termination condition is reached at block 608, then the secure network access point 104 may terminate 610 the network access session.

FIG. 7 is a diagram illustrating embodiments of session termination conditions 702. In one embodiment a session termination condition may include a session timeout event 704. For example a session timeout event 704 may include a session duration threshold being met, or may include a session inactivity duration threshold being met. One of ordinary skill in the art may recognize other suitable timeout events 704.

A session termination condition 702 may also include a transaction completion event 706. For example a transaction completion event 706 may include the completion of a single transaction. In another embodiment, a transaction completion event 706 may include completion of an authorized set of transactions.

In an embodiment, a session termination condition 702 may include a security threat detection event 708. A security threat may include an unauthorized transaction being initiated by the user interface device 106. A security threat may also include a transaction on a list of threat transactions being initiated. One of ordinary skill will recognize a variety of transactions, such as upload of viruses or malware, which may constitute security threat events.

In still other embodiments, a session termination condition 702 may include a session termination trigger 710. The session termination trigger 710 may be initiated by the user by logging out of a user session. Alternatively, the session termination trigger 710 may be initiated by the secure network access point 104 in response to one or more preset conditions being met. In still a further embodiment, the session termination trigger 710 may be initiated by a system administrator, monitor, or other $3^{rd}$ party user who is authorized to monitor transactions on the network 102.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method comprising:
receiving a request from a controlled facility resident user interface device, in use by a resident of the controlled facility, for access to a network via a secure network access point in the controlled facility;
determining an authorized duration of temporary network access for the controlled facility resident user interface device based on a transaction to be conducted between the controlled facility resident user interface device and the network;
establishing a temporary network access session between the controlled facility resident user interface device and the network via the secure network access point in the controlled facility for the authorized duration of temporary network access for carrying out the transaction via the network; and
dynamically determining the authorized duration during the temporary network access session by tracking progress of the transaction and deactivating the temporary network access session, prior to expiration of the authorized duration, in response to an end of the transaction.

2. The method of claim 1, wherein the authorized duration is statically determined prior to initiation of the temporary network access session.

3. The method of claim 1, further comprising generating a temporary network name and temporary network access key for initiating establishing the temporary network access session.

4. The method of claim 3, wherein the temporary network name and temporary network access key are valid for a limited duration of time.

5. The method of claim 4, further comprising terminating the temporary network access session in response to a determination that the temporary network name and temporary network access key have expired.

6. The method of claim 5, further comprising discarding the temporary network name and the temporary network access key in response to a determination that the temporary network name and temporary network access key have expired.

7. The method of claim 3, further comprising providing the temporary network name and temporary network access key for use by the controlled-environment resident user interface device by displaying the temporary network name and the temporary network access key for entry into the user interface device.

8. A tangible computer program product embodied in a non-transitory medium comprising computer executable code that, when executed by a data processing device, causes the computer to perform operations comprising:
receiving a request for access to a network from a controlled-environment resident user interface device in use by a resident of the controlled facility;
determining an authorized duration of temporary network access for the user interface device based on at least one transaction to be conducted between the controlled facility resident user interface device and the network;
generating a temporary network name for accessing the network via a secure network access point;
providing the temporary network name for use by the user interface device;
establishing a temporary network access session between the user interface device and the network using the temporary network name for the authorized duration of temporary network access for carrying out the at least one transaction via the network; and
dynamically determining the authorized duration during the temporary network access session by tracking progress of the transaction and deactivating the temporary network access session, prior to expiration of the authorized duration, in response to an end of the transaction.

9. The computer program product of claim 8, wherein the authorized duration is statically determined prior to initiation of the temporary network access session.

10. The computer program product of claim 8, wherein the operations further comprise generating a temporary network access key for initiating the temporary network access session.

11. The computer program product of claim 10, wherein the temporary network name and temporary network access key is valid for a limited duration of time.

12. The computer program product of claim 11, wherein the operations further comprise terminating the temporary network access session in response to a determination that the temporary network name and temporary network access key have expired.

13. The computer program product of claim 8, wherein the operations further comprise providing the temporary network name for use by the user interface device by displaying the temporary network name for entry into the user interface device.

14. The computer program product of claim 8, wherein the operations further comprise discarding the temporary network name upon expiration of the authorized duration of network access.

15. A system configured to provide limited or controlled access to data networks for residents of a controlled facility, the system comprising:
- a secure network access point disposed in a controlled facility, the secure network access point configured to provide a user interface configured to receive a request from a controlled facility resident user interface device, in use by a resident of the controlled facility, for access to a network via the secure network access point within the controlled facility;
- a network security controller coupled to the secure network access point and configured to determine an authorized duration of temporary network access for the controlled facility resident user interface device based on at least one transaction to be conducted between the controlled facility resident user interface device and the network;
- an access controller configured to generate a temporary network name for accessing the network via the secure network access point and to cause display of the temporary network name on a screen of the secure network access point for entry into the controlled facility resident user interface device;
- a network interface coupled to the secure network access point and configured to establish a temporary network access session between the controlled facility resident user interface device and the network using the temporary network name for the authorized duration of temporary network access for carrying out the at least one transaction via the network;
- a transaction monitor configured to dynamically determine the authorized duration during the temporary network access session by tracking progress of the transaction and signaling end of the transaction to the access controller upon completion of the transaction to deactivate the temporary network access session, prior to expiration of the authorized duration.

16. The system of claim 15, wherein the authorized duration is statically determined prior to initiation of the temporary network access session.

17. The system of claim 15, wherein the access controller is further configured to generate a temporary network access key for initiating the temporary network access session.

18. The system of claim 17, wherein the temporary network access key and temporary network name are valid for a limited duration of time.

19. The system of claim 18, wherein the network security controller is further configured to terminate the temporary network access session in response to a determination that the temporary network access key and/or temporary network name has expired.

20. The system of claim 19, wherein the network security controller is further configured to discard the temporary network name and the temporary network access key in response to a determination that the temporary network name and temporary network access key have expired.

* * * * *